(12) United States Patent
Hoffman et al.

(10) Patent No.: US 6,181,111 B1
(45) Date of Patent: Jan. 30, 2001

(54) PERMANENT MAGNET ALTERNATOR SYSTEM FOR BATTERY CHARGING

(76) Inventors: Lowell T. Hoffman, R.R. 4, Box 56, Bloomington, IL (US) 61704; John Paul Hoffman, 1105 N. Elmwood Ave., Peoria, IL (US) 61606

( * ) Notice: Under 35 U.S.C. 154(b), the term of this patent shall be extended for 0 days.

(21) Appl. No.: 09/357,775

(22) Filed: Jul. 21, 1999

(51) Int. Cl.[7] .................................. H02P 9/00; H02J 7/00
(52) U.S. Cl. ................................ 322/28; 322/27; 322/25; 320/163
(58) Field of Search .................................. 322/17, 25, 27, 322/28, 36, 46; 320/162, 163, 164

(56) References Cited

U.S. PATENT DOCUMENTS

| | | | |
|---|---|---|---|
| 3,341,763 | 9/1967 | Noddin | 320/39 |
| 3,508,095 | 4/1970 | Knudson et al. | 310/156 |
| 3,553,511 | 1/1971 | Hemmings et al. | 310/156 |
| 3,568,037 | 3/1971 | Williams et al. | 321/18 |
| 3,586,586 | 6/1971 | Bertioli et al. | 320/40 |
| 3,601,685 | 8/1971 | Kuhn | 322/28 |
| 3,601,688 | 8/1971 | Dogadko et al. | 323/20 |
| 3,713,015 | 1/1973 | Frister | 322/28 |
| 3,723,844 | 3/1973 | Cavil | 320/59 |
| 3,766,463 | 10/1973 | Ruben | 320/23 |
| 4,740,739 | 4/1988 | Quammen et al. | 320/14 |
| 4,806,812 | 2/1989 | Masterman | 310/182 |
| 5,191,259 | 3/1993 | Reiter, Jr. et al. | 310/156 |
| 5,280,231 | * 1/1994 | Kato et al. | 320/31 |
| 5,543,703 | * 8/1996 | Kusase et al. | 322/16 |
| 5,633,576 | 5/1997 | Rose et al. | 320/23 |
| 5,754,031 | * 5/1998 | Kanazawa et al. | 322/28 |
| 6,049,194 | * 4/2000 | Nakagawa et al. | 322/20 |

* cited by examiner

*Primary Examiner*—Nicholas Ponomarenko
(74) *Attorney, Agent, or Firm*—Husch & Eppenberger, LLC; Robert E. Muir; Kevin M. Kercher (57) ABSTRACT

A battery charging system may include a permanent magnet alternator. The system uses controlled rectifiers to supply charging output from an alternator to the battery, to control the charging current and to provide a taper charge. The system may also use a voltage regulator coupled with the controlled rectifiers. The voltage regulator progressively deactivates the controlled rectifiers, in response to the state of charge of the battery, to provide a taper charge. The alternator may be used in vehicles, including automobiles, and for other electrical generating purposes.

16 Claims, 7 Drawing Sheets

PERMANENT MAGNET ALTERNATOR SYSTEM FOR BATTERY CHARGING

FIELD OF THE INVENTION

This invention relates to charging systems for batteries. More particularly it relates to those systems in which the charging current is produced by an alternator, and especially by an alternator having permanent magnet field elements.

BACKGROUND AND SUMMARY OF THE INVENTION

The devices of this invention are electrical alternators. Typically these alternators are of a size suitable for use in automobiles and other conventional vehicles, but they are capable of use for many electrical generating purposes, for example stationary generators, power supplies for signage and the like, as is known in the art. They typically weigh a few pounds and have an electrical capacity of a few thousand watts. Such alternators have been used as battery charging units on production automobiles since the early 1960s. Since then, very little has been changed from that initial system other than to move the regulator element from a remote location to a location within the main alternator housing.

The two basic parts of such alternators are the magnetic field and the armature. The armature is the winding into which the generated voltage is induced. The magnetic field for alternators may be supplied in two ways, by an electromagnet or by a permanent magnet. In our invention the electric field is preferably supplied by a permanent magnet, but an electromagnet could be used. Permanent magnet construction provides numerous advantages in cost of construction, durability, and economy in use. However, permanent magnet alternators are not susceptible to control of the output voltage by control of the field winding current and voltage, as are alternators using electromagnets.

The present invention overcomes this obstacle and further improves on conventional alternator systems, including those using permanent magnet alternators.

The disclosed alternator system has the following advantages:

1. Lower cost of the alternator and associated equipment.
2. The alternator is physically smaller, which permits installation in smaller spaces.
3. The alternator is of lighter weight, which contributes to vehicle fuel economy.
4. The alternator is more durable and rugged, which reduces repair costs and gives a longer service life.
5. The system is more efficient (no field electrical power is required).

In the system of the invention the magneto-motive force is supplied by a permanent magnet or magnets. Thus, no slip rings or brushes are required to bring electrical power into the rotational (field) element. The permanent-magnet-powered magnetic circuit can be smaller and lower cost than the wound-rotor design. However, the magnetic circuit is not controllable. Since the field is not controllable, the invention achieves control of the system by use of unique controllable rectifier elements. The controllable rectifier elements may be coupled with suitable voltage regulating circuitry, as described herein.

As the state of charge of a battery in the system increases, its terminal voltage increases. In the system of the invention, the regulator circuit senses the battery terminal voltage. As the battery nears a fully charged state, one or more of the controllable rectifier elements is turned off for at least a portion of time. As the battery moves further from a nearly charged state to a fully charged state, more of the controllable rectifier elements are turned off for longer periods of time and the charging current is progressively reduced. This progressive decrease in charging current near the full-charge state is called taper charging. By using a plurality of controllable rectifier elements an effective taper charging may be achieved, as disclosed herein.

We are aware of the following U.S. patents, the disclosures of which are incorporated by reference herein:

| | |
| --- | --- |
| 3,341,763 | 3,508,095 |
| 3,553,511 | 3,568,037 |
| 3,586,956 | 3,601,688 |
| 3,601,688 | 3,713,015 |
| 3,766,463 | 3,723,844 |
| 4,740,739 | 4,806,812 |
| 5,191,256 | 5,633,576 |

It is an object of this invention to provide a permanent magnet alternator charging system for batteries.

It is an object of this invention to provide a charging system for batteries using permanent magnet alternators in which the charging output of the alternators is effectively controlled.

It is an object of this invention to provide a permanent magnet alternator and battery system which will function to self-charge a dead battery.

It is an object of this invention to provide an economical alternator and battery system.

It is an object of this invention to provide an efficient alternator and battery system.

It is an object of this invention to provide an alternator and battery charging system having an effective taper charging characteristic.

It is an object of this invention to provide a smaller and lighter weight alternator.

It is an object of this invention to provide a more durable alternator having a longer service life.

These and other objects of the invention will be apparent on review of the Description of the Preferred Embodiments and the Drawings.

DESCRIPTION OF THE PREFERRED EMBODIMENTS

Figure 1:
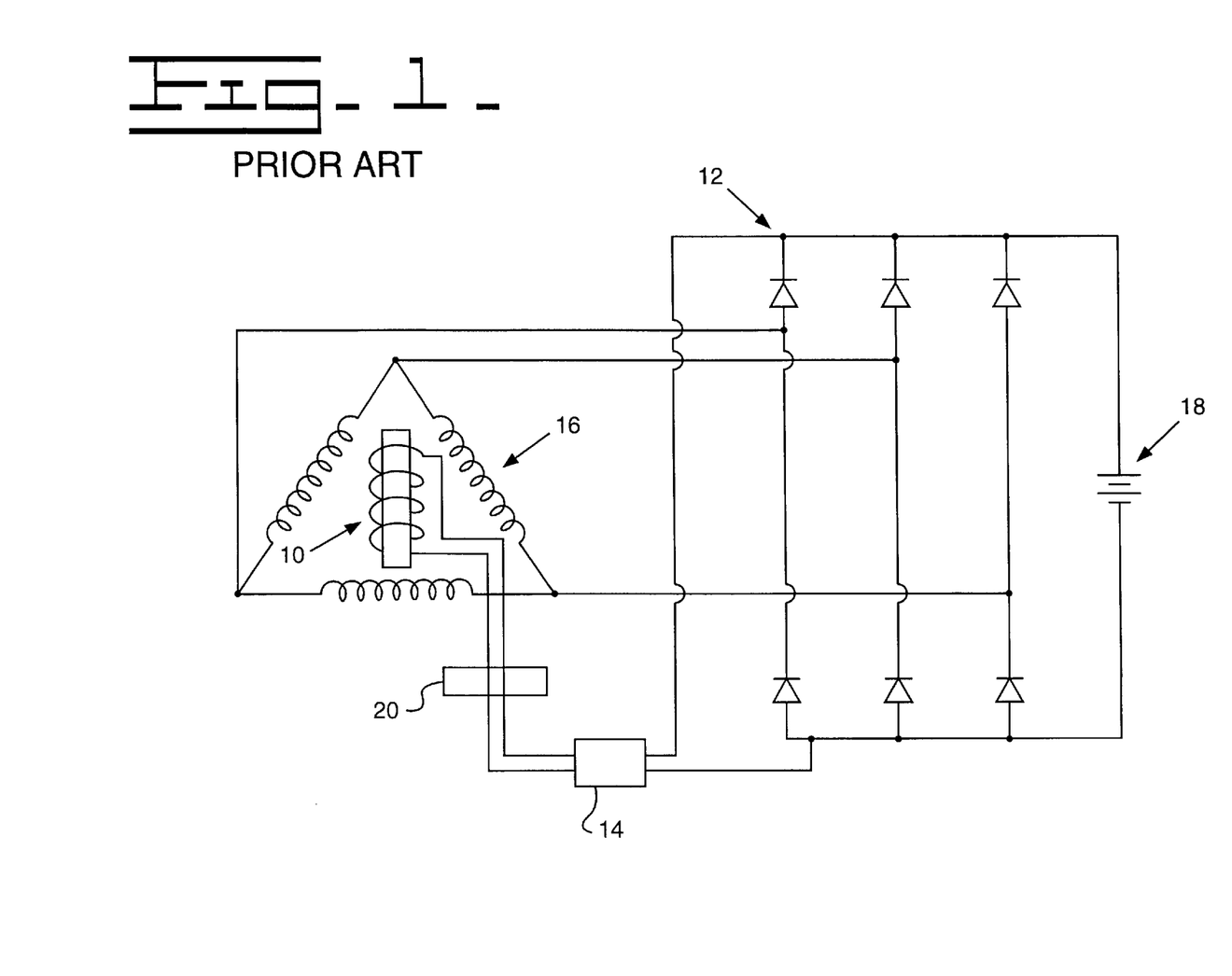
FIG. 1 is a schematic of an alternator system of the prior art.

FIG. 1 is a schematic diagram of conventional alternator system having an electromagnet produced magnetic field.

FIG. 1 is shown as a three phase alternator, but it will be appreciated that a single phase alternator is substantially similar; each possesses a wound electromagnet 10, a rectifier 12 and a regulator circuit 14 which controls the excitation of the electromagnet and the strength of the magnetic field. This control in turn controls the output of armature windings 16 and ultimately the charging output delivered to battery 18. In our system the wound electromagnet is eliminated, as are slip rings 20, thus providing a more economical, more durable and more compact unit, but losing the ability to control the charging output by controlling the field excitation.

Figure 2:
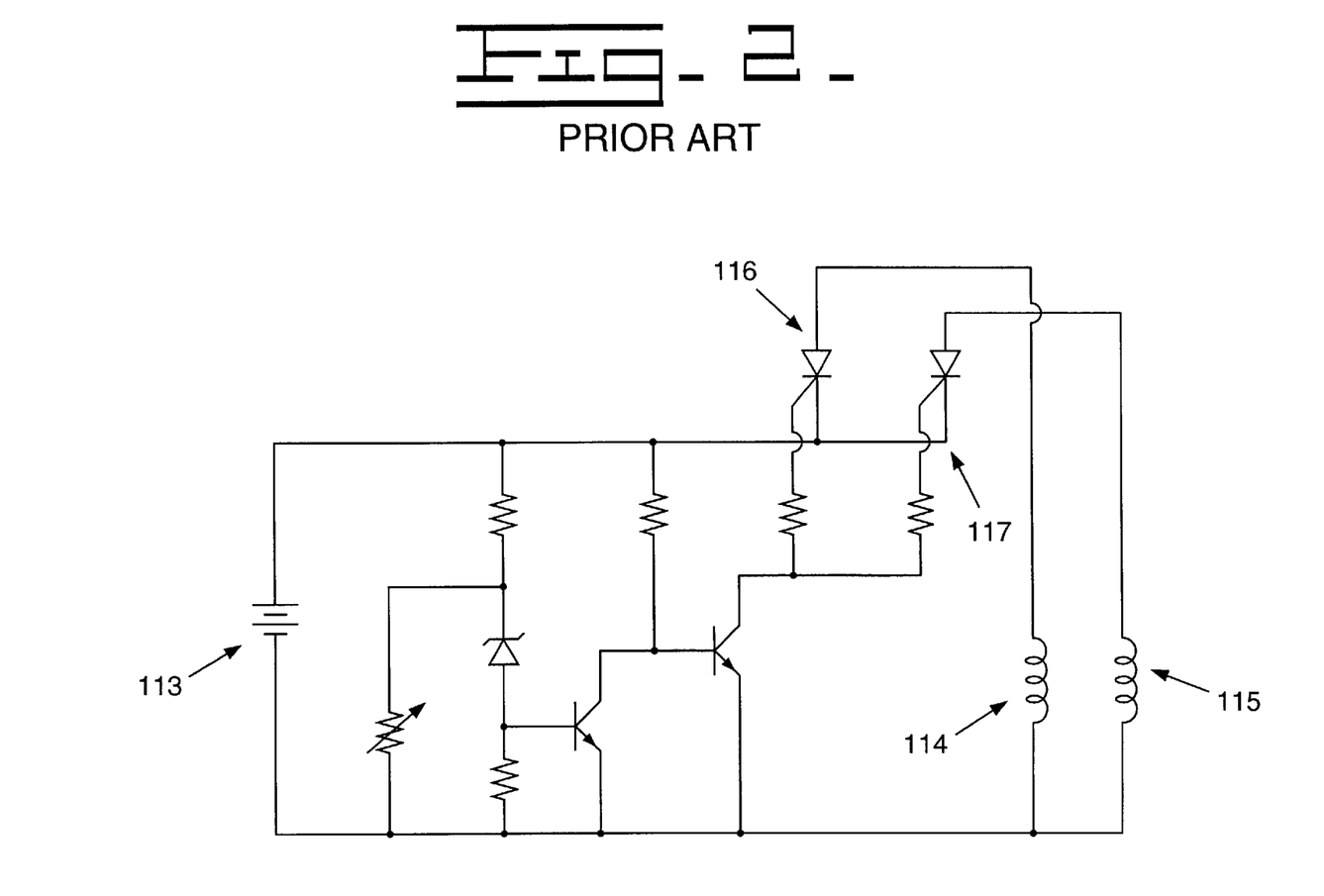
FIG. 2 is a schematic of an alternator system of the prior art.

FIG. 2 is a further prior art system, shown in schematic, which uses a permanent magnet generated field. This system is shown in U.S. Pat. No. 3,586,956. The FIG. 2 system uses negative gated thyristors 116,117 to control the output from the armature windings 114, 115 which then charges battery 113. As the state of charge of the battery increases, current to the SCR gate is reduced in magnitude which tapers the charging current to the battery. In this system, if battery 113 is completely flat, or very nearly so, an insufficient voltage is supplied to the negative gated thyristors to open the charging circuit and no charging can occur. Typically, a vehicle using this system cannot be operated under these low battery conditions, or the operation of the vehicle is seriously limited. The system of the present invention is not limited under low battery conditions, as described herein.

Figure 3:
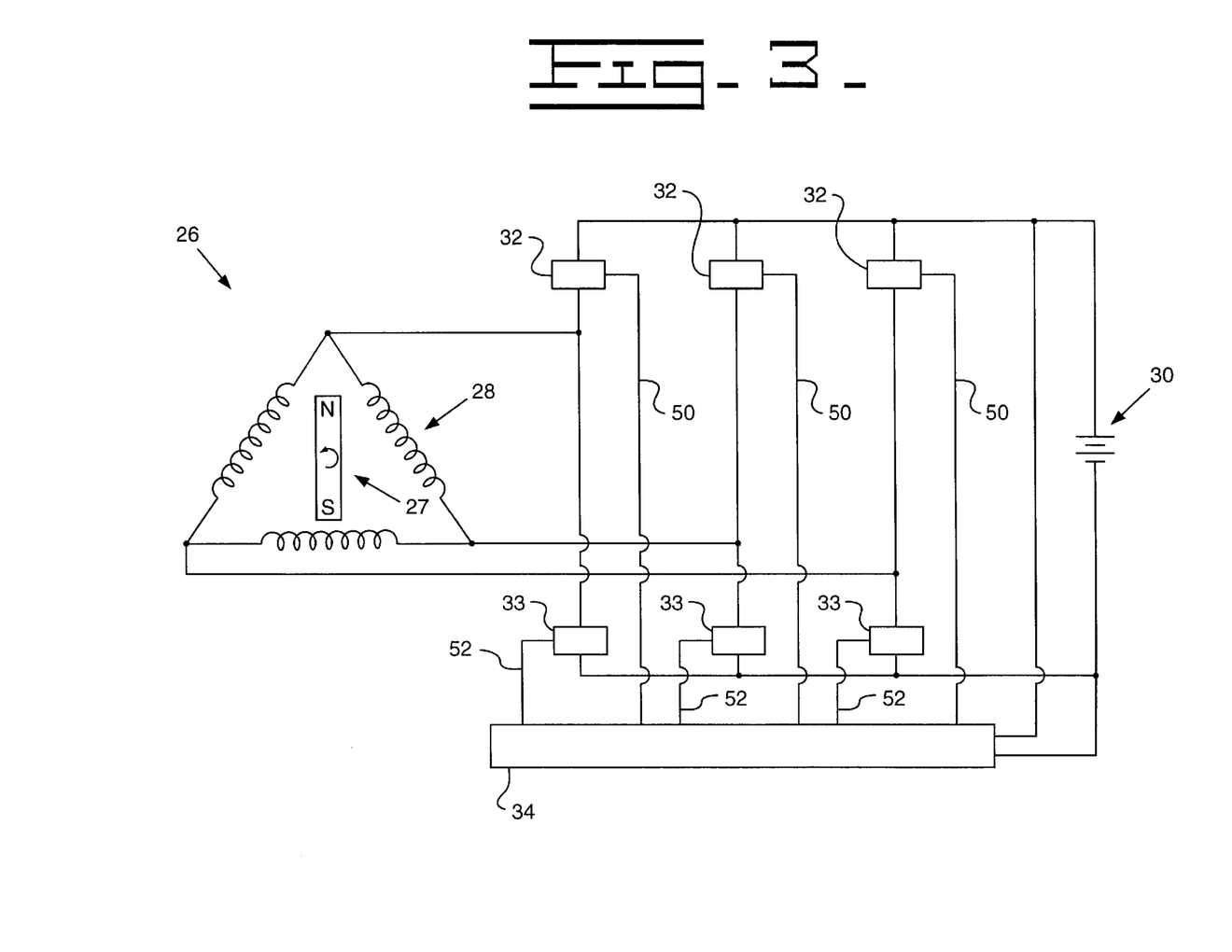
FIG. 3 is a schematic of an alternator system of the invention.

FIG. 3 is a schematic diagram of a charging system of the invention. Unlike the system shown in FIG. 1, no field windings are required by the alternator 26. Unlike FIG. 2, no negatively gated thyristors are required or used. This system is shown as three phase in FIG. 3 but it will be appreciated that a single phase system can also incorporate the invention, as could other multi-phase systems. In FIG. 3 the alternator 26 has a permanent magnet 27 to generate the magnetic field and induce voltage in armature 28, which may be of conventional configuration as is known in the art. For example, either a "Y" or delta configuration may be used. The voltage is fed to battery 30 through controlled rectifiers 32 and 33. The charging output to the battery 30 is controlled by the controlled rectifiers 32 and 33 and voltage regulator 34, since the field excitation cannot be controlled, as in the FIG. 1 system, if a permanent magnet alternator 26 is used.

The system of the invention may use an alternator which has proper magnetic circuits and proper stator windings such that the voltage delivered to the battery, at rated speed, is equivalent to that of conventional design, such as a system having a fully energized field winding, as is known in the art. For a conventional twelve volt vehicle system the voltage is about 14.5 volts, however, future vehicle systems may have other design voltages. The system may have other design ratings, for example for other uses, as is known in the art. Alternators of this design are capable of considerably greater output voltage. An open circuit voltage of 140 RMS is easily reached for example. As known in the art, the specific output characteristics of an alternator depend on a number of design factors, including the number of magnetic poles in the magnetic circuit employed, the strength of the magnets, the number of turns of wire in the armature, the wire size and the rotational speed of the alternator. The sizing of an alternator for a particular use is conventional and known to those skilled in the art.

In use, rotational mechanical power is applied to the rotor element causing it to turn. Since the rotor contains the magneto-motive force of the system, (for example, one or more permanent magnets), the turning rotor causes the magnetic flux to rotate. The rotating flux interacts with (cuts) the stator windings and induces an alternating voltage into the stator windings. The magnitude of the induced voltage is a function of rotor speed. As rotor speed increases, at some point the peak induced voltage will exceed the voltage of the battery to be charged. The controlled rectifiers 32 and 33 act as simple diode rectifiers and charging current flows into the battery 30. As rotor speed increases further. charging current increases.

As the state of charge of the battery 30 increases, its terminal voltage increases. Voltage regulator 34 senses the terminal voltage of battery 30. As the battery 30 nears a fully charged state, the voltage regulator 34 sends a turn-off signal to one or more of the controlled rectifiers 32 and 33 through lines 50. 52. As the battery 30 moves from a nearly-charged state to a fully-charged state, the voltage regulator 34 will turn off more of the elements of controlled rectifiers 32, 33 and thus more of the charging current. (This decrease in charging current near the full-charge state is called taper charging). The tapering is controlled by voltage regulator 34, as described herein.

Figure 4:
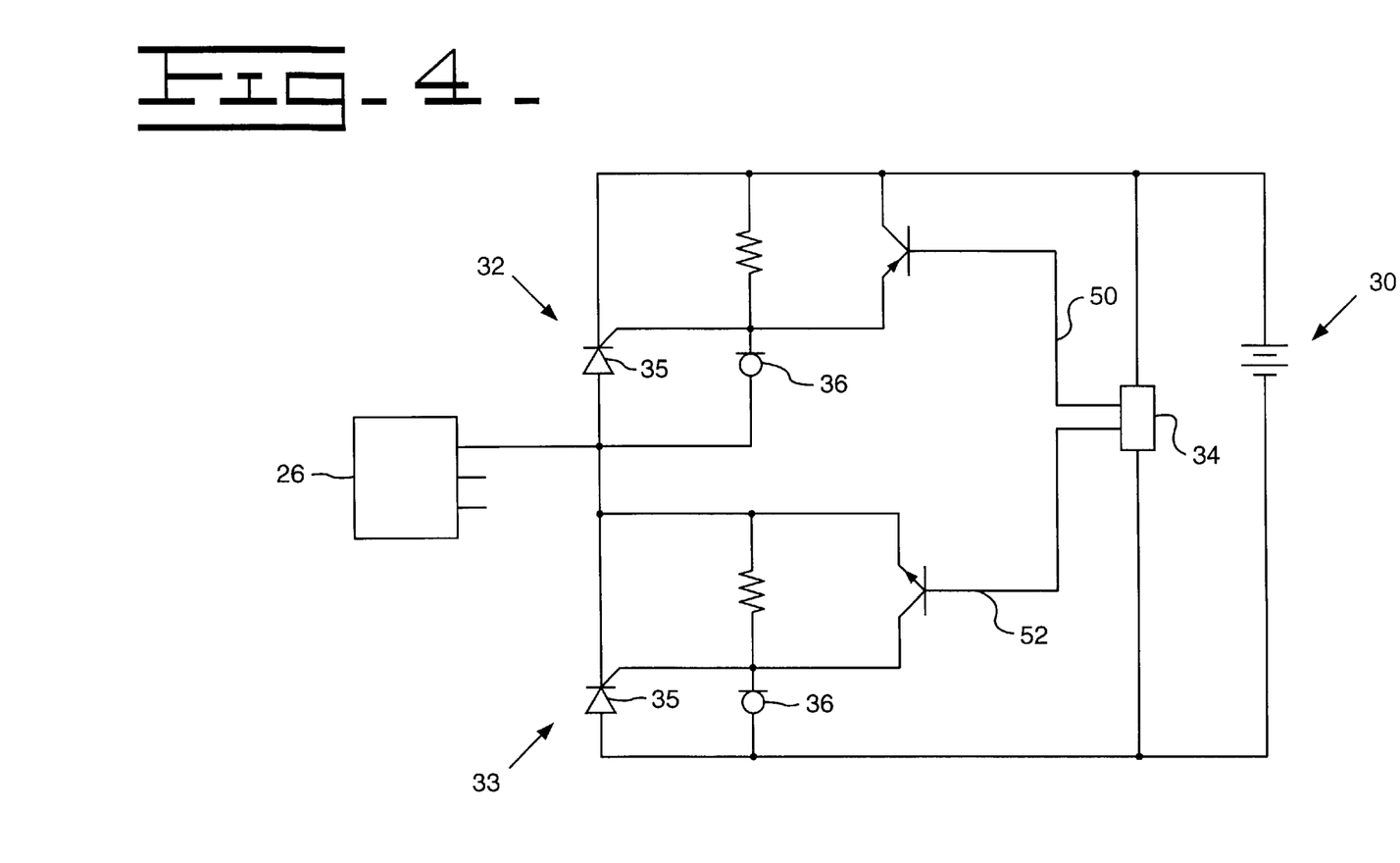
FIG. 4 is a schematic of the controllable rectifiers of the invention which may be used in the system of FIG. 3.
Figure 5:
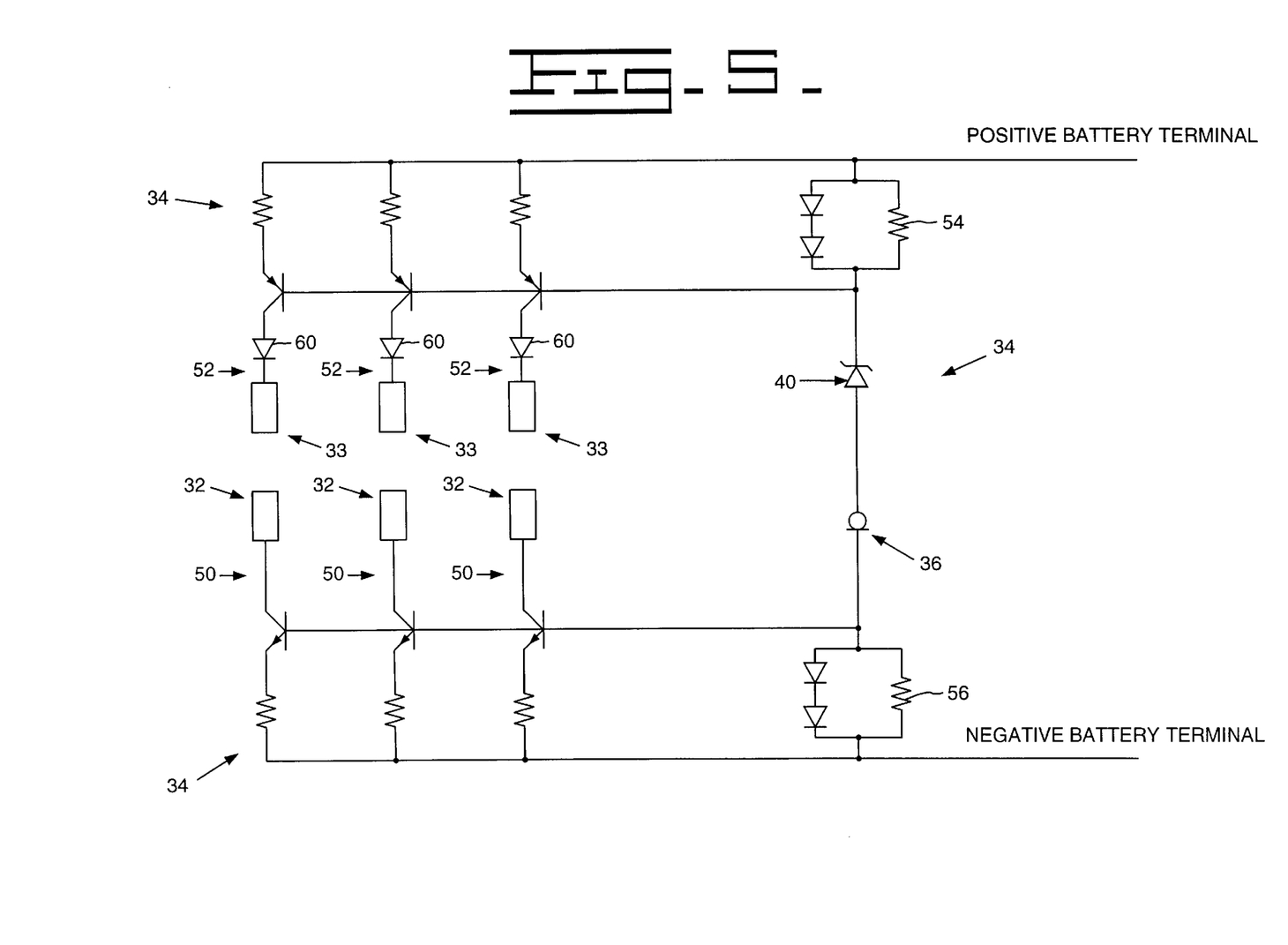
FIG. 5 is a schematic of a voltage regulator of the invention which may be used in the system of FIGS. 3 and 4.

FIG. 3 shows six controlled rectifiers 32 and 33. However, six are not necessary. Three elements can provide an effective taper charge and have a lower cost, as disclosed herein. However, six controlled rectifiers 32 and 33 may provide a broader and smoother taper charge. FIG. 4 shows controlled rectifier circuitry for an upper rectifier 32 and a lower rectifier 33. FIG. 5 shows voltage regulator 34 circuit connected to three controlled rectifiers 32 in the upper position of FIG. 3 and three controlled rectifiers 33 in the lower position of FIG. 3.

The drawing figures show the system using individual components readily available in the electronics industry. However, there are many other components and other connections which can be used to perform the regulating and rectifying functions, as is known in the art. In volume commercial production, it is expected that the components would be integrated, for example, in the same package as the power element (SCR, and associated components). Alternatively, most or all of the circuitry could be combined in one integrated circuit. Many integration and packaging schemes are possible, as is known in the art. The system may be temperature compensated as known in the art, in FIG. 6 for example, by using temperature dependent resistors with element TL431.

The SCR 35 is the central component in the circuit, as shown in FIG. 4. It handles full charging current to the battery when turned "On". The other components allow or disallow SCR gate current in such a way as to modulate the disclosed regulating battery charging system.

As shown in FIG. 5, the system includes a field effect diode, i.e., a current regulating diode 36. The function of the field effect diode 36 is generally inverse to that of a Zener diode in that the field effect diode 36 maintains a constant current whereas a Zener diode would maintain a constant voltage. The characteristic of the field effect diode 36 maintains an essentially constant current even though its terminal voltage varies widely. Commercially available field effect diodes will maintain current regulation over a voltage range of about 1 volt to 100 volts. When included in the circuity shown in FIGS. 4 and 5 a voltage capacity of greater than 100 volts may be easily obtained with conventional components.

The following describes how the controllable rectifiers 32 and 33 work much like an ordinary junction diode when maximum charging current is being delivered to the battery, i.e., when the regulator 34 is not telling the controllable rectifiers 32 and 33 to turn "Off." For the circuit of FIG. 4, if the anode voltage with respect to cathode starts to go positive the SCR 35 will not conduct because it will have no gate current. As the voltage continues to increase to the turn-on voltage of the field effect diode 36, the regulating current will flow. Part of the current will flow through the resistor and part of it will become SCR gate current. At this condition the SCR 35 has gate current and it will snap "On" and the overall system will carry charging current to the battery 30. Once the SCR 35 snaps "On," its terminal voltage will be low, possibly too low for the field effect diode 36 to supply gate current. However, that is not a problem since an SCR, once fired, will remain "On" until its current goes to near zero.

In FIG. 4, when the anode goes negative with respect to the cathode neither the SCR 35 or the field effect diode 36 can conduct current in the reverse direction, so nothing happens in the system.

Referring again to FIG. 4, when the regulator 34 circuit places a controllable rectifier 32, 33 in the "Off" state, the regulator 34 does so by causing/allowing current to flow in control lines 50, 52. Even though the anode is positive and field effect diode 36 is carrying current, there will be no SCR gate current and the SCR 35 will remain "Off". The SCR 35 remains "Off" because the control line current turns "On" the transistor which shorts the gate to the cathode, that is, the "On" transistor shunts the field effect diode 36 current around the resistor and directly to the cathode end away from the gate.

There is an additional condition which may be possible in the system. This condition is not required for operation, but if it should occur it will not compromise the system. Referring to FIG. 4, if the regulator 34 is causing/allowing control line current when the anode goes negative, the system will not be compromised since the SCR 35 and field effect diode 36 cannot conduct with reverse polarity. In addition, if current flows from battery positive to collector to base of the transistor, down the control line 50 and to/through the regulator 34 this current will be of low magnitude. The amplitude of the current is limited by the resistance of the regulator 34 and is not harmful. When the anode of controllable rectifiers 33 goes negative, reverse current in control line 52 may be prevented by a diode 60 in regulator 34, as shown in FIG. 5.

Figure 6:
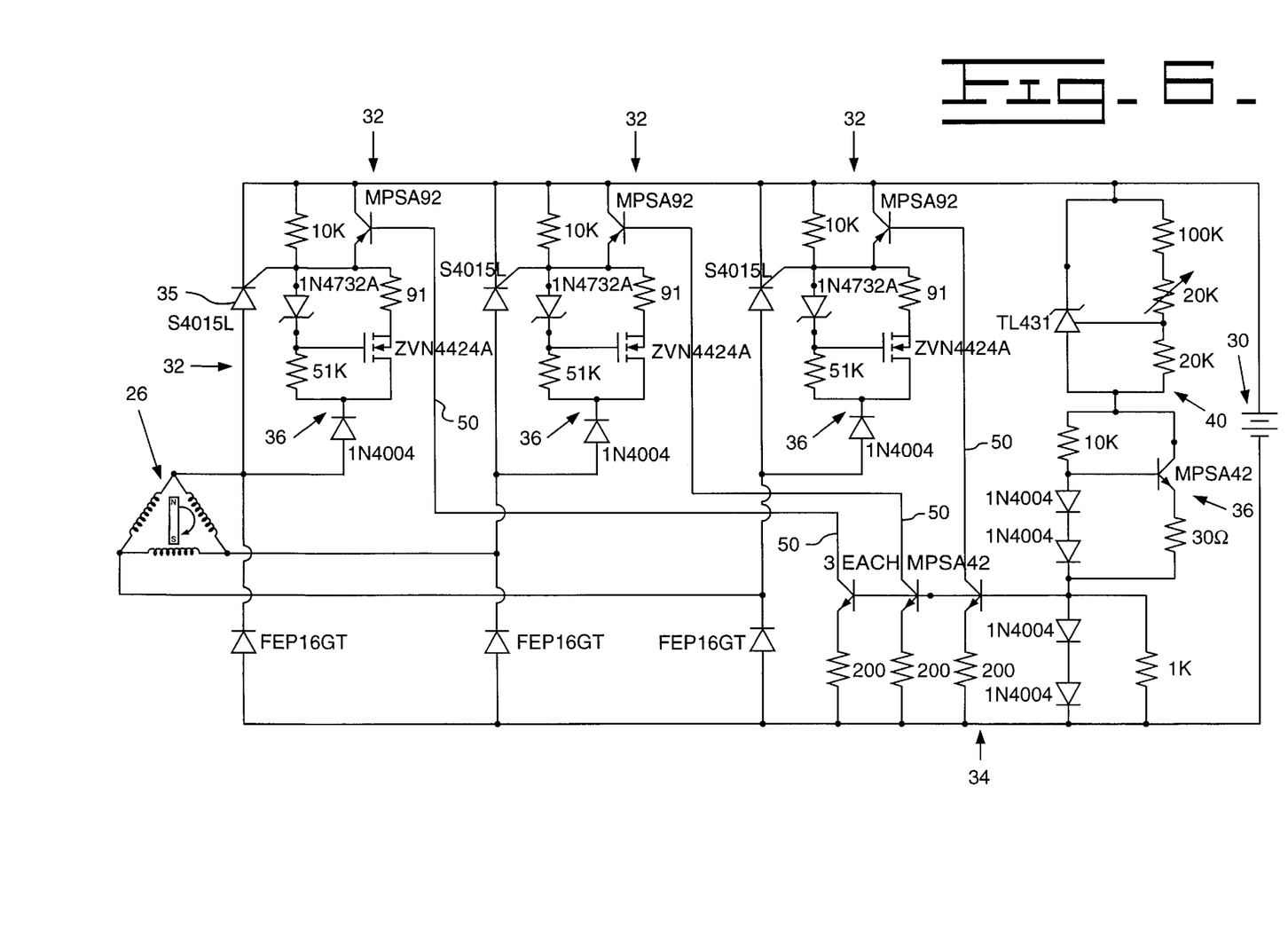
FIG. 6 shows an alternate embodiment of the invention using three controllable rectifiers and shows further details of the field effect and Zener diodes.

Voltage regulator 34 circuits are shown in FIGS. 5 and 6. One terminal of the regulator 34 connects to battery positive and another to battery negative. Thus the regulator 34 circuit is able to sense the battery voltage and state-of-charge, as described herein. As shown in FIG. 5, as the battery voltage reaches a value where the charging current should be reduced, the Zener diode 40 will start to conduct. Current will flow through the Zener diode 40, through the field effect diode 36, and through the upper and lower resistors 54, 56, which may be of equal value. The voltage across the resistors 54, 56 is also the base voltage for an associated group of three transistors, as shown. As the voltage reaches the turn on voltage of the transistors, base current will start and the transistors will start to turn "On". Thus, current is caused/allowed in the control lines 50, 52, to the controllable rectifiers 32, 33 and they will turn "Off". A regulator 34, for a system with three controllable rectifiers 32 is shown in FIG. 6; the operation is similar to that described for FIG 5.

As shown in FIG. 5, as the regulator 34 transistors start to draw base current, when the system is in a modulating mode, they will also cause/allow a small control line current. There will then be a condition where the rectifiers 32, 33 can sometimes be "On" and sometimes "Off". Since the rectifiers 32, 33 are sometimes "Off", i.e., deactivated, the charging current will be decreased. As the battery voltage continues to rise, with increased state of charge, currents in the regulator 34 (Zener diode 40, field effect diode 36, resistors 54, 56, base currents) will increase as will control line currents. Thus, the SCRs 35 will receive more, but still reduced, gate current and they will be "Off" a greater portion of time. When the battery 30 reaches full charge voltage there will be enough regulator currents and control line currents to completely turn "Off" the rectifiers 32, 33; thus, no battery charging occurs. In this portion of the system the field effect diode 36 does not affect charging operation, but is a safety item. If, for example, an over charged battery 30 were installed in the system or if the battery 30 were "jumped" from a higher voltage system, the field effect diode 36 limits current to a non-harmful level.

The embodiment shown in FIG. 6 uses three controllable rectifiers 32. In FIG. 6 the details of the field effect diodes 36 and the regulator 34 with Zener diode 40 are also shown in more detail. The operation of this system is essentially like that described above for FIG. 5. The voltage regulator 34 senses the state-of-charge of battery 30 and progressively turns "Off" the controllable rectifiers 32 to provide a taper charge. It will be appreciated that various alternative circuit arrangements may be used for the individual elements and specific circuit shown, as is known in the art. It will be appreciated that the system described is not limited under low battery conditions, as is the FIG. 2 prior art system. Referring to FIG. 6, under low battery conditions the gate current is supplied to the SCR 35 in controllable rectifier 32 through field effect diode 36 from the armature of alternator 26. Current is produced when mechanical input is applied to the alternator 26. When the battery 30 is sufficiently charged, the MPSA92 transistor in controllable rectifier 32 shunts the current from the field effect diode 36 away from the gate of SCR 35.

Figure 7:
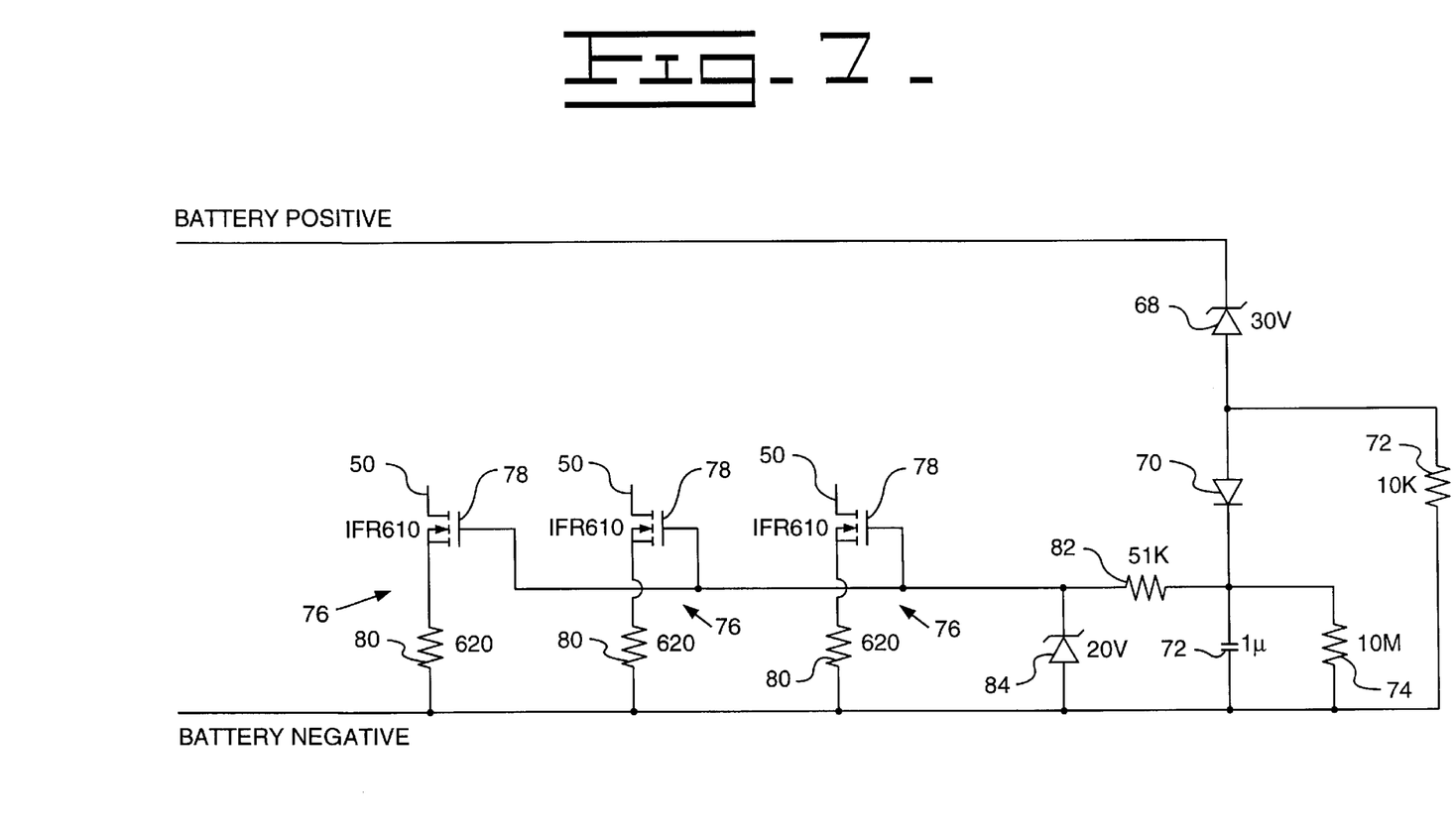
FIG. 7 shows an additional circuit, which may be added to FIG. 6, to limit the energy output under load dump conditions.

Consider FIGS. 6 and 7 for the load dump response of the present system. A load-dump means that the electrical load on the alternator 26, including the battery 30, instantly goes to zero, by disconnect or broken wires for example. If the load-dump occurs while a controllable rectifier 32 is "ON", the voltage across the unloaded alternator output terminals will quickly rise and stay abnormally high during the remainder of the alternation during which the dump occurred. In the steady-state, the no-load conditions for FIG. 6, for example, are quite reasonable. The three phase-voltages of armature 28 will remain and will be higher than desired for charging purposes. Each of the field effect diodes 36 will pass current, during part of its respective phase-voltage. These currents will be either gate currents for controllable rectifier 32 or as transistor MPSA92 currents. The currents will combine and flow through Zener diode 40 and thus turn "ON" the three MPSA42 transistors of regulator 34. Since these regulator transistors are "ON" the controllable rectifiers 32 will be held "OFF" and the possibility of gate current mentioned above does not occur.

A summary of the load-dump performance of FIG. 6 is, 1) could be a high voltage for one alternation and 2) the system is well-behaved thereafter.

The high voltage can also be limited by the addition of a conventional "TRANZORB" or "MOV" device (metal oxide varister) across the alternator output terminals. This device may be physically outside the alternator somewhere on the machine, or internal, as is known in the art. The present invention is much more amenable to this type of limiting device than are conventional alternator designs.

In the present invention, the limiting device must absorb energy for one alternation, probably less than ten milli-sec, but no more than tens of milli-seconds.

For conventional designs the limiting device must absorb energy until the regulator circuit can get the field current reduced to a suitable value. Conventionally, the absorption time may be as long as several hundred milli-seconds. In contrast, the energy absorption needed for the present invention is at least an order of magnitude reduced from that needed for conventional alternators. Reduced absorption means less size, less cost, and more reliability for the limiting, i.e., absorbing device.

There remains the possibility that conditions could occur which are not suitably handled by the aforementioned methods. For example, 1) a partial load-dump. Perhaps the worst case would be if the battery connection were lost, but some other loads remain, 2) if the invention were implemented in a single-phase form, there would be no phase overlap and thus no continuous current to/through the regulator, and 3) if the load-dump were intermittent, at a somewhat rapid rate.

For item 1, there may be enough load left that field effect diode 36 currents flow though the partial load rather than the regulator 34 circuits. Thus, the controllable rectifiers 32 are not continuously held "OFF". Every time a controllable rectifier 32 fired, the output voltage would go high and the regulator would turn "OFF" all controllable rectifiers 32. However, they would not stay "OFF" indefinitely, and there could be a series of one-alternation bursts. Item 2 is similar in the sense that with no phase overlap, the regulator 34 does not always hold the controllable rectifiers 32 "OFF". Again, a series of one-alternation bursts may occur. In item 3 there are recurring load-dumps. As mentioned before, there could be a one-alternation high-voltage burst for each dump. Rarely, but potentially, the recurrence rate could be high. In that case, the average energy absorption needed in a "TRANZORB" type device could add considerable cost to the system.

In FIG. 7, if the alternator 26 output goes too high, due to load-dump, for example, to a value somewhere between a normal regulating voltage and a TRANZORB-limiting or harmful value, the circuit will sense said high output voltage and will place the controllable rectifier 32 in the "OFF" state for a significant length of time. Several seconds would be enough. With this configuration there will be a series of bursts, but they will be widely separated in time. If, for example, a load-dump voltage pulse of fifty volts appeared at the battery-positive terminal of the alternator 26, the thirty volt Zener diode 68 and the junction diode 70 would turn "ON" and charge the capacitor 72 to about twenty volts. This capacitor 72 discharges slowly because the discharge occurs only though the ten meg-ohm resistor 74 and any leakage paths. The capacitor voltage essentially becomes the gate voltage for the three current sinks 76 consisting of IRF610's, (78) and the 620 ohm resistors 80. The 51 k ohm resistor 82 and the twenty volt Zener diode 84 merely protect the gate of the IRF 610's (78) from exceeding twenty volts. While the voltage of capacitor 72 remains significant, the current sinks 76 will be operational and thus hold controllable rectifiers 32 "OFF" for a significant and controllable length of time.

While the invention has been described in connection with specific embodiments, it will be understood by one skilled in the art that these are provided only by way of example. The embodiments disclosed are not intended as limitations to the scope of the invention, but it is intended that the invention be limited only by the scope of the appended claims and their equivalents.

We claim:
1. A battery charging system comprising:
a battery;
an alternator charging said battery; and a means for controlling charging input to said battery, wherein said controlling means includes
a means for rectifying said charging input to said battery; and
a means for limiting said charging input to said battery in response to a state of charge of said battery, and said limiting means includes
a means for at least partially deactivating said rectifying means and reducing said charging input to said battery supplied by said rectifying means, said battery charging system includes
a means for self-charging under low battery charge conditions, and includes
a means for supplying current from the alternator through said controlling means to said limiting means to close a charging path to said battery,
wherein said controlling means includes a means for shunting said current away from said limiting means as the state of charge of said battery increases.
2. The system of claim 1, wherein said system includes a means for progressively deactivating said rectifying means.
3. The system of claim 2, wherein said system includes a means for sensing said state of charge of said battery and said partially deactivating means is responsive to said state of charge of said battery.
4. The system of claim 1, wherein said alternator is a permanent magnet alternator.
5. The system of claim 4, wherein said system includes means for sensing said state of charge of said battery.
6. The system of claim 4, wherein said system includes a means for progressively deactivating said rectifying means.
7. The system of claim 6, wherein the progressively deactivating means is responsive to said state of charge of said battery.
8. The system of claim 7, wherein the system includes a means for sensing the state of charge of said battery.
9. The system of claim 1, wherein said rectifying means includes
a plurality of rectifying elements.
10. The system of claim 9, wherein said system includes a means for sensing said state of charge of said battery.
11. The system of claim 9, wherein said system includes a means for progressively deactivating said rectifying means.
12. The system of claim 11, wherein said partially deactivating means is responsive to said state of charge of said battery.
13. The system of claim 12, wherein the system includes a means for sensing said state of charge of said battery and selectively and progressively deactivating said individual rectifying elements in response to said state of charge of said battery.
14. The system of claim 13, wherein said system is a vehicle system.
15. A battery charging system comprising:
a battery; and
an alternator charging said battery, wherein said system includes
a controller to control charging input current to said battery, said controller includes a rectifier to rectify said charging input to said battery and an input limiter to limit said charging current input to said battery, said input limiter being responsive to a state of charge of said battery and further includes a deactivator that partially deactivates said rectifier in response to the state of charge of said battery and reduces said charging current input to said battery; said system further includes a charging path to supply current from said alternator through said controller to said battery under low battery conditions whereby said system is self-charging Linder low battery conditions, wherein said controller includes a shunt to shunt said charging current input away from said input limiter as the state of charge of said battery increases.

16. A battery charging system for a power supply comprising:

a battery; and a permanent magnet alternator, wherein said alternator is supplying charging input current to said battery, said system includes a controller to control the charging input current to said battery; said controller includes a rectifier having a plurality of rectifying elements to rectify said charging input current to said battery and an input limiter to limit said charging current input to said battery, said input limiter includes a sensor to sense a state of charge of said battery and being responsive to said state of charge of said battery; said input limiter further includes a deactivator to at least partially deactivate said rectifier in response to said state of charge of said battery, said deactivator progressively deactivating said rectifier elements in response to said state of charge of said battery and reducing said charging current input to said battery; said controller further includes a shunt to shunt the charging current input away from said input limiter as the state of charge of said battery increases; said system further includes a charging path to supply current from said alternator through said controller to said battery under low battery conditions, wherein said system is self-charging under low battery conditions and said deactivator selectively and progressively deactivates individual rectifying elements in response to said state of charge of said battery and wherein said system includes a means for protecting said system under adverse load conditions.

* * * * *